(12) United States Patent
Yang et al.

(10) Patent No.: US 9,359,014 B1
(45) Date of Patent: Jun. 7, 2016

(54) THERMOPLASTIC OLEFIN BUILDING MATERIALS

(71) Applicant: BUILDING MATERIALS INVESTMENT CORPORATION, Dallas, TX (US)

(72) Inventors: Li-Ying Yang, Whippany, NJ (US); Arnis Paeglis, Wayne, NJ (US); Daniel Podewils, Evansville, IN (US)

(73) Assignee: BUILDING MATERIALS INVESTMENT CORPORATION, Dallas, TX (US)

( * ) Notice: Subject to any disclaimer, the term of this patent is extended or adjusted under 35 U.S.C. 154(b) by 0 days.

(21) Appl. No.: 14/558,702

(22) Filed: Dec. 2, 2014

(51) Int. Cl.
*C08J 5/18* (2006.01)
*B62D 29/04* (2006.01)
*B62D 25/06* (2006.01)
*B62D 65/02* (2006.01)

(52) U.S. Cl.
CPC .............. *B62D 29/043* (2013.01); *B62D 25/06* (2013.01); *B62D 65/02* (2013.01); *C08J 5/18* (2013.01); *C08J 2323/10* (2013.01); *C08J 2423/12* (2013.01)

(58) Field of Classification Search
CPC ....... C08L 23/16; C08L 9/00; C08L 2205/03; E04D 1/20; E04D 1/22; E04D 5/06
See application file for complete search history.

(56) References Cited

U.S. PATENT DOCUMENTS

| | | | |
|---|---|---|---|
| 4,130,535 | A | 12/1978 | Coran |
| 6,864,195 | B2 | 3/2005 | Peng |
| 7,666,491 | B2 | 2/2010 | Yang |
| 7,799,406 | B2 | 9/2010 | Yang |
| 7,927,695 | B2 | 4/2011 | Raulie |
| 8,327,594 | B2 | 12/2012 | Merryman |
| 8,389,634 | B2 | 3/2013 | Yalvac |
| 8,635,827 | B2 | 1/2014 | Merryman |
| 8,663,413 | B1 * | 3/2014 | Peng ............ B32B 37/153 156/244.11 |
| 2004/0185288 | A1 | 9/2004 | Peng |
| 2006/0046084 | A1 * | 3/2006 | Yang ............ B32B 5/022 428/500 |

FOREIGN PATENT DOCUMENTS

| | | |
|---|---|---|
| WO | 96/07681 | 3/1996 |
| WO | 2009/155115 | 5/2009 |
| WO | WO 2012 088689 A * | 7/2012 .......... C08L 23/10 |

OTHER PUBLICATIONS

Bubak et al., "TPVs in Automotive," TPE Magazine, Issue 01 (Jan. 2011).
EMSEAL Expansion Joints and Pre-Compressed Sealants technical sheet, "RoofJoint," EMSEAL Joint Systems Ltd. http://www.emseal.com/Products/Architectural/RoofJoint/RoofJoint.htm.
Extended European Search Report dated Mar. 24, 2016 in European patent application No. 15197155.3.

* cited by examiner

*Primary Examiner* — Nathan M Nutter
(74) *Attorney, Agent, or Firm* — Baker & McKenzie LLP

(57) ABSTRACT

The present disclosure relates, in some embodiments, to thermoplastic-olefin-based roofing membrane comprising a polymer blend. The polymer blend may comprise a thermoplastic olefin elastomer at about 30% to about 75% by weight of the polymer blend and a thermoplastic vulcanizate at about 10% to about 40% by weight of the polymer blend. The polymer blend may further comprise a thermoplastic polyolefin copolymer at about 5% to about 10% by weight of the polymer blend. In some embodiments, the thermoplastic olefin-based roofing membrane may be a single ply membrane configured to remain substantially free of swelling when exposed to an elastomer polymer compound. The thermoplastic olefin-based roofing membrane may be about 20 mils to about 40 mils thick. The thermoplastic-olefin-based roofing membrane may comprise a stretchability of about 14 lbf to about 30 lbf.

14 Claims, 4 Drawing Sheets

THERMOPLASTIC OLEFIN BUILDING MATERIALS

FIELD OF THE DISCLOSURE

The present disclosure relates, in some embodiments, to thermoplastic-olefin-based roofing membrane including, for example, single ply thermoplastic-olefin-based roofing membranes suitable for use on or application to roofing constructions of recreational vehicles.

BACKGROUND OF THE DISCLOSURE

Various types of occupancy structures may use roofing constructions to shield or otherwise protect the occupancy structure from factors such as weather, sunlight, and other environmental forces. For example, a recreational vehicle (RV) may be exposed to extreme environmental forces.

As part of a roofing construction, roofing membranes may be used. Roofing membranes may have various performance characteristics such as sheet extrudability, flexibility, colorability, embossing and stretchability, and more. Roofing membranes may have apertures and/or edges at structural features such as, for example, vents, air conditioning units, and skylights. In some situations, roof caulk sealants may be applied around roof membranes at the apertures and/or edges to promote sealing and/or waterproofing of components of roofing constructions. Certain materials used as roofing membranes may not stand up well to extreme environmental forces because the materials may chalk, lose color, shrink, or may not lay flat. Further, in some situations, roofing membranes may exhibit swelling when contacting roof caulk sealant. More specifically, solvent from caulk sealants may migrate to adjacent roofing membranes and cause membranes to deform and/or swell.

SUMMARY

Accordingly, a need has arisen for improved roofing membranes that exhibit reduced and/or minimal swelling when contacting roof caulk sealants, while maintaining desired performance characteristics. The present disclosure relates, in some embodiments, to thermoplastic-olefin-based roofing membrane comprising a polymer blend. A polymer blend may comprise a thermoplastic olefin elastomer (e.g., at about 30% to about 75% by weight) and a thermoplastic vulcanizate (e.g., at about 10% to about 40% by weight). As used herein, the term by weight may denote by weight of a polymer blend or by weight of a thermoplastic-olefin-based roofing membrane in which a component is included. A polymer blend may further comprise a thermoplastic polyolefin copolymer (e.g., at about 5% to about 10% by weight). In some embodiments, a thermoplastic olefin-based roofing membrane may be a single ply membrane configured to remain substantially free of swelling when exposed to solvent containing an elastomer polymer compound. In some embodiments, an elastomer polymer compound may be a roof sealant. A thermoplastic olefin-based roofing membrane may be about 20 mils to about 40 mils thick. A thermoplastic-olefin-based roofing membrane may have a stretchability of about 14 lbf to about 30 lbf.

In some embodiments, a polymer blend may comprise about 30% to about 50% by weight of a thermoplastic olefin elastomer. In some embodiments, a polymer blend may comprise about 10% to about 25% by weight of a thermoplastic vulcanizate. A thermoplastic-olefin-based roofing membrane may have a stretchability of about 20 lbf to about 28 lbf. In some embodiments, a thermoplastic olefin used may comprise one or more polypropylene based ethylene propylene elastomers (e.g., ExxonMobile "Vistamaxx", Dow Versify. A thermoplastic vulcanizate may be selected from crosslinked ethylene propylene diene monomer and polypropylene blend. In some embodiments, a thermoplastic polyolefin copolymer may be an impact polypropylene copolymer.

A thermoplastic-olefin-based roofing membrane may comprise, in some embodiments, a colorant. A thermoplastic-olefin-based roofing membrane may be applied to a roofing construction of a recreational vehicle. Thermoplastic-olefin-based roofing membranes of the present disclosure may be substantially free of swelling, and/or may provide for a swelling height of less than about 0.25". In some embodiments, the thermoplastic-olefin-based roofing membrane may be about 28 mils thick.

In some embodiments, a thermoplastic-olefin-based roofing membrane may comprise a thermoplastic olefin elastomer, wherein the thermoplastic olefin elastomer is a propylene/alpha-olefin copolymers with semi-crystalline isotactic propylene segment. The alpha-olefins may be selected from the group consisting of ethylene, butene, pentene, 4-methyl-1-pentene, hexane, heptene, octane and nonene. In some embodiments, a thermoplastic-olefin-based roofing membrane may comprise a thermoplastic olefin copolymer that may be an impact polypropylene copolymer such as ethylene.

The present disclosure relates, according to some embodiments, to RV roofing construction systems. For example, an RV roofing construction system may comprise a vent disposed thereon. In some embodiments, a thermoplastic-olefin-based roofing membrane may be disposed on, adhered to, or otherwise secured to an RV roofing construction system. A thermoplastic-olefin-based roofing membrane of an RV roofing construction system may comprise a polymer blend. A polymer blend may comprise a thermoplastic olefin elastomer (e.g., at about 30% to about 75% by weight), and a thermoplastic vulcanizate (e.g., at about 10% to about 40% by weight). A polymer blend may further comprise a thermoplastic polyolefin copolymer (e.g., at about 5% to about 10% by weight). A thermoplastic-olefin-based roofing membrane may be a single ply membrane and may be about 20 mils to about 40 mils thick. In some embodiments, an RV roofing construction system may further comprise a caulk sealant disposed adjacent to a thermoplastic-olefin-based roofing membrane. A thermoplastic-olefin-based roofing membrane of an RV roofing construction system may be substantially free of swelling when exposed to an elastomer polymer compound. For example, a thermoplastic-olefin-based roofing membrane of an RV roofing construction system may be substantially free of swelling when exposed to a solvent based elastomer polymer compound or a solvent comprising elastomer polymer compounds.

In some embodiments, the present disclosure relates to methods of using a thermoplastic-olefin-based roofing membrane. For example, methods may comprise applying a thermoplastic-olefin-based roofing membrane to a roofing construction. Methods may further comprise applying a caulk sealant adjacent to a thermoplastic-olefin-based roofing membrane. Methods of the present disclosure may use thermoplastic-olefin-based roofing membrane comprising thermoplastic olefin elastomer (e.g., at about 30% to about 75% by weight of a polymer blend), and thermoplastic vulcanizate (e.g., at about 10% to about 25% by weight of a polymer blend), and thermoplastic polyolefin copolymer (e.g., at about 5% to about 10% by weight of a polymer blend). A thermoplastic-olefin-based roofing membrane may be a single ply membrane configured to remain substantially free of swelling when exposed to an elastomer polymer compound of the caulk sealant. A thermoplastic-olefin-based roofing membrane may be about 20 mils to about 40 mils thick. In some embodiments, a roofing construction may be applied to a recreational vehicle roofing construction.

BRIEF DESCRIPTION OF THE DRAWINGS

Some embodiments of the disclosure may be understood by referring, in part, to the present disclosure and the accompanying drawings, wherein.

DETAILED DESCRIPTION

Figure 1:
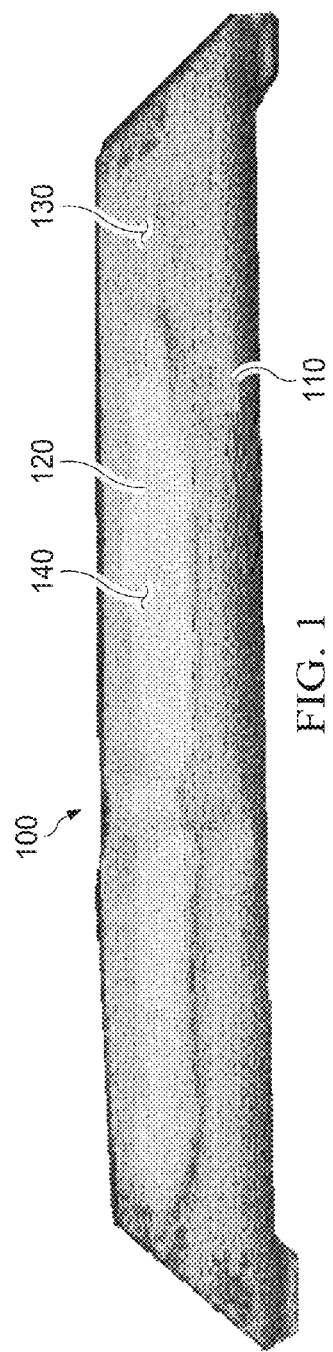
FIG. 1 illustrates a profile view of a thermoplastic-olefin-based roofing membrane according to a specific example embodiment of the disclosure.

The present disclosure relates, in some embodiments, to thermoplastic-olefin-based roofing membranes. More specifically, embodiments of the present disclosure may provide for single ply thermoplastic-olefin-based roofing membranes suitable for use on or application to roof constructions of RVs. In some embodiments, the present disclosure may advantageously provide for thermoplastic-olefin-based roofing membranes that exhibit reduced and/or minimal swelling when contacting roof caulk sealants, while maintaining desired performance characteristics. Such performance characteristics may include, but is not limited to, sheet extrudability, flexibility, colorability, and embossing and stretchability.

RVs may have roofing constructions with various features such as vents, air conditioning units, and skylights. Such features may form edges or apertures in the roofing membranes of roofing constructions. During installation of RV roofing membranes, roofing grade caulk or sealants may be applied around edges or apertures of roofing membranes to make roofing joints airtight and/or watertight. Roof caulk sealants may be made of solvent based elastomer polymer compounds. Solvents may migrate and may come into contact with adjacent roofing membranes. Thermoplastic olefin (TPO) that comes into contact with solvents comprising elastomer polymer compounds may exhibit deformation and swelling. Long-term exposure can lead to eventual softening and deterioration of the membrane. Deformation and swelling of TPO membranes may reduce the airtight and/or watertight sealing of the roofing membrane. Such deformation and swelling may also reduce the overall aesthetics of the roofing construction.

In some embodiments, benefits of embodiments of the present disclosure may be particular advantageous for roofing structures wherein the roofing structure is not one flat roof. For example, embodiments of the present disclosure may advantageous provide for a roofing membrane that conforms to and/or fits against the curvature of the roofing structure or between transitions of different segments or sections of a roofing structure.

Composition

Some embodiments of the present disclosure formulate single ply nonreinforced TPO membranes with polypropylene based elastomers (PBE), polypropylene copolymers, fillers, colorants, UV and thermal stabilizers, and thermoplastic vulcanizate (TPV).

In some embodiments, TPO membranes of the present disclosure may comprise 100 parts highly stretchable TPO compounds, 0-80 parts fire retardant, 0-5 parts UV and thermal stabilizers, 5-10 parts colorant (e.g. titanium dioxide), and 0-80 parts calcium carbonate. Stretchable TPO compounds may comprise polypropylene based elastomer (PBE), impact polypropylene copolymer (IPC), and thermoplastic vulcanizate (TPV).

PBE polymer compositions may comprise propylene/alpha-olefin copolymers with semi-crystalline isotactic propylene segments. In some embodiments, PBE may have a comonomer range between about 5% to about 16%. In some embodiments, a comonomer range may be less than about 16%. Comonomers may be alpha-olefins. In addition, in some embodiments, the PBE polymers may have a narrow molecular weight distribution of 2-3. The molecular weight distribution may be indicated by Mw/Mn (also referred to as polydispersity index or "PDI" or "MWD").

Various TPOs may be suitable for use in the embodiments of the present disclosure. For example, in some embodiments, a TPO may be a polypropylene based ethylene propylene elastomer. In some embodiments, a TPO may be ExxonMobile "Vistamaxx" (e.g. 6100 and/or 6102). One method of producing such a TPO may comprise blending a "first polymer component" ("FPC") with a "second polymer component" ("SPC"). The FPC may be a predominately crystalline stereoregular polypropylene. The SPC may be a crystallizable copolymer of a $C_2$, $C_4$-$C_{20}$ alpha-olefin and propylene. Other, possibly optional, components of the blend are SPC2, may include crystallizable copolymer of a $C_2$, $C_4$-$C_{20}$ alpha-olefin (preferably ethylene), and process oil. Other optional components may include fillers, colorants, antioxidants, nucleators, and flow improvers.

FPC may melt higher than about 110° C. Further, FPC may have a heat of fusion of at least about 75 J/g, as determined by DSC analysis. The crystalline polypropylene may be either homopolymer or copolymers with other alpha olefins. The SPC and the SPC2, if used, have stereoregular propylene sequences long enough to crystallize. The SPC may have a melting point of less than about 105° C. and may have a heat of fusion of less than about 75 J/g. The SPC2 may have a melting point of less than about 115° C. and may have a heat of fusion of less than about 75 J/g.

Some embodiments may be achieved by blending isotactic polypropylene (FPC) with ethylene propylene copolymers (SPC) having about 4 wt % to about 35 wt % ethylene. Such blending may promote high compatibility with the FPC. Both the FPC and the SPC may have isotactic propylene sequences long enough to crystallize. The ratio of the FPC to the SPC of the blend composition may vary in the range of 1:99 to 95:5 by weight and, in particular, in the range 2:98 to 70:30 by weight.

In some embodiments, propylene based elastomers of the present disclosure may have a glass transition temperature range of about −25 to about −35° C. The glass transition temperature may be the temperature above which a polymer becomes soft and pliable, and below which it becomes hard and glassy. The propylene based elastomers of the present disclosure may have a MFR range measured at about 230° C. of between about 0.5 to about 25 and a melt temperature range of about 50° C. to about 120° C.

In some embodiments, propylene based elastomers of the present disclosure may have a preferred shore A hardness range of about 60 to about 90. However, the shore A hardness range may be below 60. In some embodiments, the propylene based elastomers of the present disclosure may have a flexural modulus range of about 500 Psi to about 6000 Psi. In some embodiments, the flexural modulus range may be about 1000 to about 5000 Psi.

Polypropylene based elastomers of the present disclosure may be present in the roofing membrane at a concentration of about 55% to about 85% of total TPO polymers. In some embodiments, the amount may be from about 65% to about 75%, such as a concentration of about 70%.

ICP polymer compositions of the present disclosure may be propylene/alpha-olefin copolymers with semi-crystalline isotactic propylene segments. Alpha-olefins include ethylene, butene, pentene, 4-methyl-1-pentene, hexane, heptene, octene, nonene etc. The flexural modulus of polypropylene impact copolymers may be about 80,000 to about 140,000 psi per ASTM D790. In some embodiments, the flexural modulus may be about 100,000 to about 130,000 psi. ICP may have a MFR range measured at 230° C. per ASTM D1238 between about 0.5 to about 5.

TPO of the present disclosure may be present in a polymer blend of a thermoplastic-olefin-based roofing membrane at about 30% to about 75% by weight. In some embodiments, a TPO may be present at about 35% to about 50% by weight. In some embodiments, a TPO may be present at about 40% to about 45% by weight. Higher concentrations of TPO in a thermoplastic-olefin-based roofing membrane may promote better processability and/or extrudability.

In some embodiments, thermoplastic olefin elastomers of a thermoplastic-olefin-based roofing membrane may have a melt flow rate of about 0.5 g/10 min to about 5 g/10 min per ASTM D1238 measurement at 230° C. Thermoplastic olefin elastomers of the present disclosure may comprise a flexural modulus of about 500 to about 5000 psi per ASTM D790. In some embodiments, thermoplastic polyolefin copolymers of a thermoplastic-olefin-based roofing membrane may have a flexural modulus of about 8000 to about 150,000 psi per ASTM D790.

Polypropylene impact copolymers of the present disclosure may be present in the roofing membrane at concentrations of about 5% to about 25% by weight of a polymer blend. In some embodiments, the concentration may be about 5% to about 10%. Suitable polypropylene impact copolymers may include Basell Profax 8623, Flint Hill 16S2, 17S2, 18S2, P6E2A-005B, Dow 6D82 and Braskem TI6035NB.

TPV of the present disclosure may be a dynamically vulcanized polypropylene elastomer. In some embodiments, a TPV may be a crosslinked ethylene propylene diene monomer and polypropylene blend. TPV of the present disclosure may be about 10% to about 40% by weight of a polymer blend of a thermoplastic-olefin-based roofing membrane. In some embodiments, TPV may be present about 10% to about 25% by weight. As used herein, the term by weight may denote by weight of a polymer blend or by weight of a thermoplastic-olefin-based roofing membrane. A higher concentration of TPV may advantageously promote characteristics that reduce swelling of a thermoplastic-olefin-based roofing membrane. A lower concentration of TPV may advantageously promote characteristics that increase extrudability and overall ease of production. Suitable TPVs may include ExxonMobil Santoprene™ products, Technor Apex Sarlink™ TPV, PolyPrime Nexprene and Mitsui Milastomer.

TPO membranes of the present disclosure may have a thicknesses of about 15 to about 50 mils, and more particularly from about 20 to about 40 mils In some embodiments, TPO membranes may have a thickness of about 28 mils TPO membranes of the present disclosure may be any color such as white, grey, or beige. TPO membranes may also have predetermined printed or embossed designs on a surface.

Suitable ingredients in addition to polymers in the non-reinforced TPO membrane may include, but are not limited to: fillers, color pigments, fire retardants, antioxidants, UV and thermal stabilizers and/or processing aids. Suitable ranges of the above ingredients may include, but are not limited 100 parts highly stretchable TPO compounds, 0-80 parts fire retardant, 0-5 parts UV and thermal stabilizers, 5-10 parts titanium dioxide or other colorants, and 0-80 parts calcium carbonate.

In some embodiments of the present disclosure, inclusion or addition of TPV may advantageously improve solvent resistance of nonreinforced TPO roofing membrane while maintaining desirable performance characteristics. Performance of the currently disclosed embodiments with respect to sheet extrudability, flexibility, layflat, colorability, and embossing and stretchability, may be comparable to or better than that of other conventional roofing materials, such as EPDM rubber.

The presently disclosed embodiments of thermoplastic-olefin-based roofing membranes may advantageously be more resistant to solvent migration and/or membrane swelling. In fact, in some embodiments, the degree of solvent migration and/or membrane swelling may be relatively minimal and/or may be comparable to that of other conventional roofing materials, such as EPDM rubber. The relatively minimal solvent migration and/or membrane swelling may be achieved without the need to vulcanize 100% or about 100% of the roofing materials, which may often be required for EPDM rubber.

Systems

The present disclosure also provides for various roofing constructions making use of aforementioned compositions for thermoplastic-olefin-based roofing membranes. In some embodiments, systems may comprise RVs wherein thermoplastic-olefin-based roofing membranes have been disposed on or otherwise applied to roofing constructions of the RVs. Thermoplastic-olefin-based roofing membranes used in systems of the present disclosure may be formulated with polypropylene based elastomers (PBE), polypropylene copolymers, fillers, colorants, UV and thermal stabilizers, and thermoplastic vulcanizate (TPV). Further, thermoplastic-olefin-based roofing membranes used in systems of the present disclosure may be disposed or otherwise applied adjacent to caulk sealants comprising elastomer polymer compounds. In some embodiments, thermoplastic-olefin-based roofing membranes used in systems of the present disclosure may be disposed or otherwise applied adjacent to solvent based elastomer polymer compounds.

In some circumstances, the regions of a roofing structure that may be more prone to swelling may include the joint areas between roofing membranes and the roof members. Such joint areas may include vents, air conditioning units, and/or skylights. Application of the presently disclosed embodiments near such regions or joint areas may advantageously provide for the aforementioned benefits, such as reduced swelling and improved stretchability.

Methods of Use

The present disclosure also provides for various methods of using the aforementioned compositions for thermoplastic-olefin-based roofing membranes. More specifically, the present disclosure may provide for methods of applying thermoplastic-olefin-based roofing membranes to roofing constructions. Methods may involve applying a thermoplastic-olefin-based roofing membrane to a roofing construction. In some embodiments, the roofing construction is part of an RV.

Methods may further comprise applying a caulk sealant adjacent to the thermoplastic-olefin-based roofing membrane.

As previously explained, embodiments of the present disclosure may advantageously provide for thermoplastic-olefin-based roofing membranes exhibiting reduced and/or minimal swelling when exposed to solvents comprising elastomer polymer compounds. Accordingly, in the presently described methods, applying a caulk sealant adjacent to the thermoplastic-olefin-based roofing membrane may result in minimal swelling and/or deformation of the thermoplastic-olefin-based roofing membranes. Thus, methods of the present disclosure may advantageously provide for RV roofing structures that are better sealed and more aesthetically pleasing.

Methods of Manufacturing

According to another aspect of the present disclosure, methods of manufacturing TPO membranes are provided. In some embodiments, methods of manufacturing may comprise mixing a thermoplastic polyolefin and thermoplastic vulcanizate polymers with at least one of the following ingredients of a fire retardant, a UV and thermal stabilizers, a colorant (e.g., titanium dioxide), and a calcium carbonate in polymer processors such as extruders. Methods of manufacturing may further comprise extruding TPO mixture through a sheet die to a thicknesses of about 15 to about 50 mils and various widths of about 0.5 to about 10 feet. Methods of manufacturing may further comprise embossing the extruded material to a thickness of about 3 to about 15 mils to form a single ply roofing membrane, wherein the embossed single ply roofing membrane has a stretchability in the range of about 14 lbf to about 30 lbf, as tested with about a 30-mil thickness sample under the "stretchability test." In some embodiments, the TPO polymer may be mixed with UV and thermal stabilizers, colorants, and calcium carbonate.

In some embodiments, methods of manufacturing may comprise wide sheet extrusion. TPV extrusion may be challenging due to TPV's high viscosity and elasticity. To produce a wide membrane with uniform thickness across about 10-ft width, the good melt flowability of extrudate may be desirable.

EXAMPLES

Figure 2:
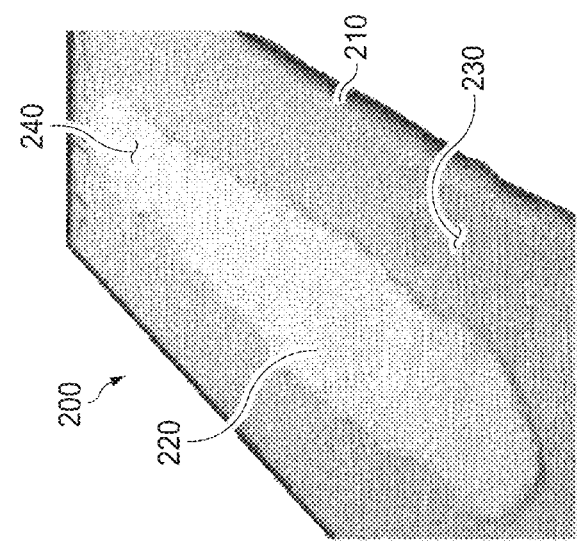
FIG. 2 illustrates a perspective view of a thermoplastic-olefin-based roofing membrane according to a specific example embodiment of the disclosure.

Example embodiments of thermoplastic-olefin-based roofing membranes are illustrated in FIG. 1 and FIG. 2. FIG. 1 and FIG. 2 illustrate profile and perspective views of thermoplastic-olefin-based roofing membrane 100, 200 according to specific example embodiments of the present disclosure. Roofing membranes 100, 200 are provided by way of example only, and may comprise any variation of the aforementioned compositions of roofing membranes. Roofing membrane 100 may be formulated with various concentrations of polypropylene based elastomers (PBE), polypropylene copolymers, fillers, colorants, and UV and thermal stabilizers. Roofing membrane 200 may be formulated with various concentrations of polypropylene based elastomers (PBE), polypropylene copolymers, fillers, colorants, and UV and thermal stabilizers, and thermoplastic vulcanizate (TPV). As described, roofing membrane 100 may be free or substantially free of TPV. In contrast, roofing membrane 200 may comprise a particular concentration of TPV.

As shown in FIG. 1 and FIG. 2, thermoplastic-olefin-based roofing membranes 100, 200 may have particular thicknesses 110, 210. In some embodiments, thickness 210 of a roofing membrane 200 comprising TPV may advantageously be slimmer relatively to thickness 110 of a roofing membrane 100 that does not comprise TPV. As shown in FIG. 1, a roofing membrane 100 substantially free of TPV may exhibit considerable deformation and/or swelling. As a result, thickness of thermoplastic-olefin-based roofing membrane 100 may increase and may not be ideal for promoting airtight and/or watertight sealing of a roofing membrane against a caulk sealant or a roofing construction. Further, swelling of a TPO surface may be aesthetically unattractive. The lesser thickness 210 shown in FIG. 2 may be more aesthetically pleasing and may be indicative of reduced and/or minimal deformation and/or swelling of roofing membrane 200. Further, reduced swelling may advantageously provide for improved performance in achieving airtight or watertight sealing on roofing structures. TPO membranes without TPV may exhibit swelling of greater than about 0.625". In contrast, TPO membranes with TPV may advantageously provide for swelling heights of about 0.25" or less.

As shown in FIG. 1 and FIG. 2, roof caulk sealant 120, 220 may be disposed on thermoplastic-olefin-based roofing membranes 100, 200. Roof caulk sealant 120, 220 may comprise roof caulk surface 140, 240. As shown in FIG. 2, roof caulk surface 240 may be relatively smooth and free of swelling and/or surface defects. Roof caulk surface 240 of embodiment wherein roofing membrane 200 comprises TPV may advantageously be smoother and may be more aesthetically pleasing than roof caulk surface 140 of embodiment wherein roofing membrane 100 is substantially free of TPV. Similarly, roofing membrane surface 230 of embodiment wherein roofing membrane 200 comprises TPV may advantageously be smoother and may be more aesthetically pleasing than roofing membrane surface 130 of embodiment wherein roofing membrane 100 is substantially free of TPV. Smoother surfaces 240, 230 may be more aesthetically pleasing and may be indicative of reduced and/or minimal deformation and/or swelling of roofing membrane 200. Smoother surface 240, 230 may also more advantageously provide for consistent and secure sealing of edges or apertures of thermoplastic-olefin-based roofing membrane 200 against or near caulk sealants.

Figure 3:
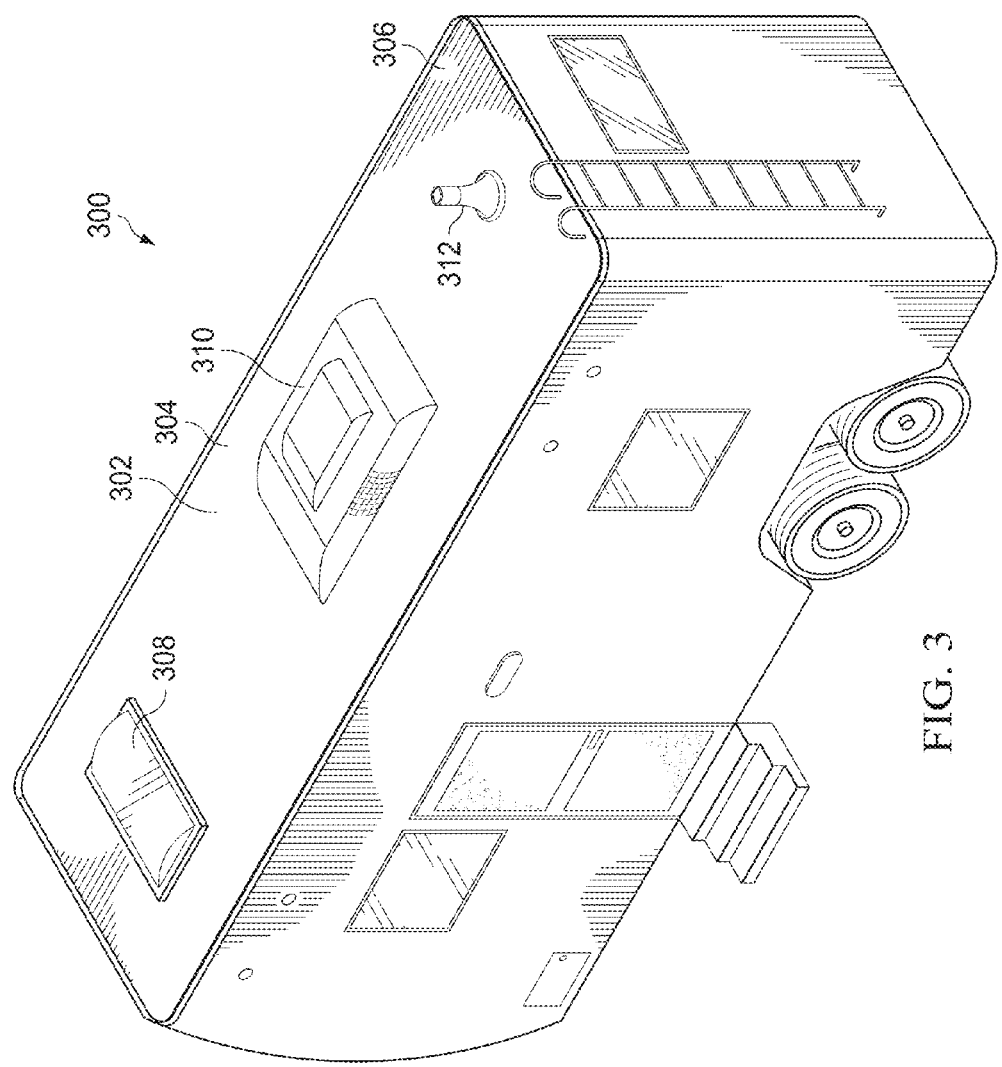
FIG. 3 illustrates a perspective view of an occupancy structure in the form of a recreational vehicle.
Figure 4:
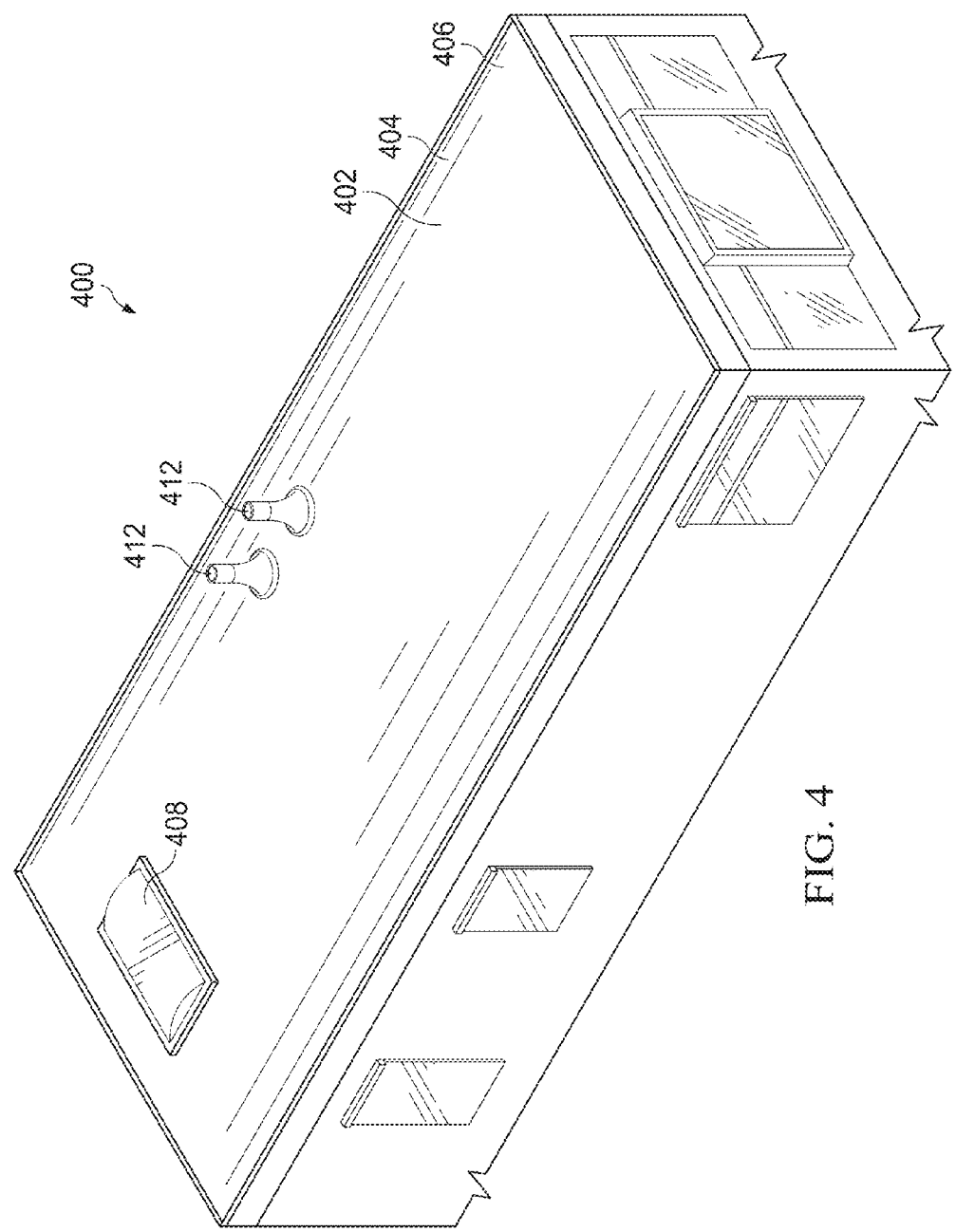
FIG. 4 illustrates a perspective view of a section of an occupancy structure in the form of a recreational vehicle.
Figure 5:
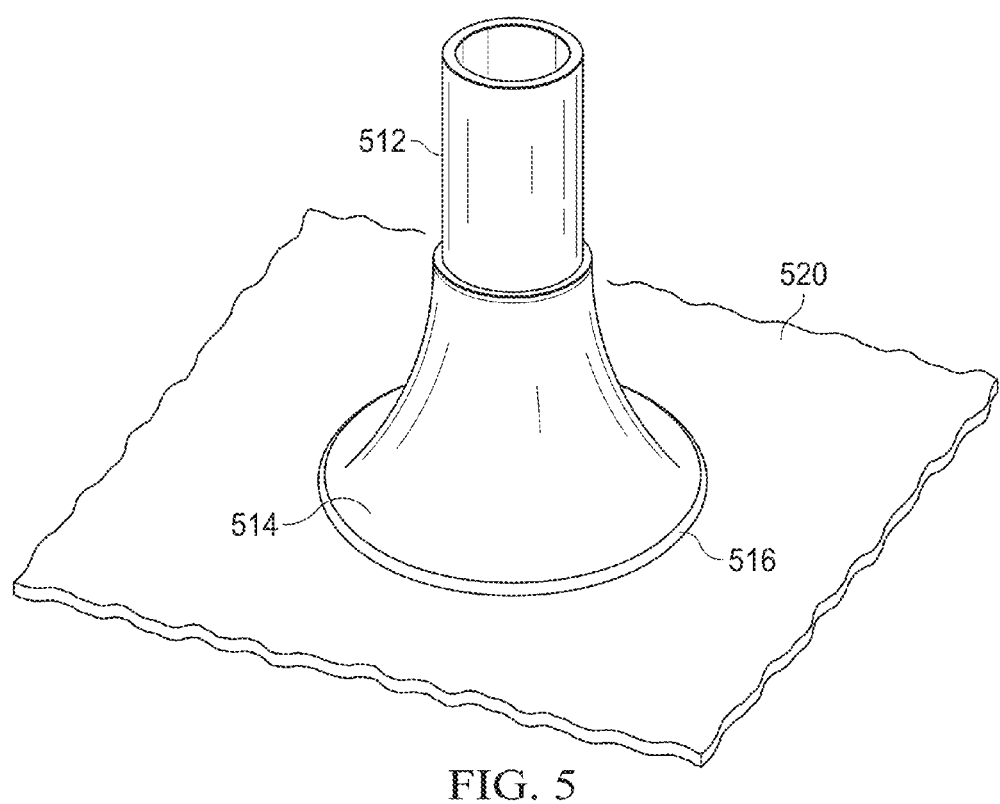
FIG. 5 illustrates a perspective view of a vent of an occupancy structure in the form of a recreational vehicle.

Example embodiments of systems comprising thermoplastic-olefin-based roofing membranes according to the present disclosure are illustrated in FIG. 3, FIG. 4, and FIG. 5.

FIG. 3 depicts a perspective view of an occupancy structure in the form of recreational vehicle 300. FIG. 4 depicts a perspective view of a section of an occupancy structure in the form of recreational vehicle 400. As shown, recreational vehicle 300, 400 may comprise roofing structure 302, 402. Roofing structure 302, 402 may comprise surface 304, 404, which may be formed to have different geometries. Various geometries may be appropriate. For example, in some embodiments, surface 304, 404 of roofing structure 302, 402 may be substantially flat. In some embodiments, surface 304, 404 of roofing structure 302, 402 may have a certain degree of curvature. Flexibility and stretchability afforded by TPO membranes of the present disclosure may advantageously provide for better conformity against the curvature or geometry of surface 304, 404 of roofing structure 302, 402. For example, roofing structure 302, 402 may comprise corners 306, 406. TPO membranes of the present disclosure may exhibit improved stretchability and reduced swelling neat caulk sealants. Thus, TPO membranes of the present disclosure may better fit or conform to the curvature or geometries of corners 306, 406.

Further, TPO membranes of the present disclosure may better conform to the geometries and/or edges of various features that may be disposed on surface 304, 404 of roofing structure 302, 402. For example, roofing structure 302, 402 may comprise skylight 308, 408, air conditioning unit 310, and/or vent 312, 412. Other features may be disposed on roofing structure 302, 402 without departing from the scope of the present disclosure. Additionally, as shown in FIG. 4, roofing structures 302, 402 may comprise a plurality of said features. For example, two or more vents 412 may be disposed on surface 412 of roofing structure 402. Skylight 308, 408, air conditioning unit 310, and/or vent 312, 412 may have features that result in protruding edges on surface 304, 404 of roofing structure 302, 402. TPO membranes of the present disclosure may exhibit improved stretchability and reduced swelling near caulk sealants. Thus, TPO membranes of the present disclosure may better fit or conform to the curvature or geometries of said protruding edges.

For example, FIG. 5 illustrates a perspective view of vent 512 that may be disposed on a roofing structure of an occupancy structure, such as a recreational vehicle. Vent 512 may comprise base 514 with edge 516 having a particular geometry. As shown in FIG. 5, in some embodiments, edge 516 may have a circular geometry. In some embodiments, edge 516 of a feature disposed on a roofing structure may have a linear, curvilinear, or polygonal geometry. TPO membranes of the present disclosure may advantageously better fit or conform to such geometries. For example, TPO membrane 520 may conform to edge 516 of vent 512. Reduced swelling exhibited by TPO membrane 520 may advantageously provide for better sealing against edge 516 and may provide for a more aesthetical roofing surface.

Specific Example Embodiments

TABLE 1

|  | Example 1 | Example 2 | Example 3 |
| --- | --- | --- | --- |
| Polymers (100%) | 71% Vistamaxx 6102; 11% ICP; 18% TPV | 67% Vistamaxx 6102; 15% ICP; 22% TPV | 100% TPO 0% TPV |
| Thickness | 28 mils | 28 mils | 29 mils |
| Stretchability (CMD 1" (lbf)) | 28 | 26 | 27 |
| Tear Strength (lbf) | 14/16 | 15/18 | 14/16 |
| Roofing Membrane Swelling (Height with Caulk) | Minimum (0.25") | Minimum (0.25") | Severe (0.625") |

Experimental data, such as that presented in Table 1, may be collected in various manners. For example, stretchable nonreinforced TPO membrane may be wrapped around a particular surface. In some circumstances, the surface may be a 10" by 3' plywood board. Next, RV roof membrane solvent based caulk sealant may be applied to the membrane surface. The RV roof membrane solvent based caulk sealant may be applied using a caulk gun, and may be applied in 1" bead forms. In some circumstances, the RV roof membrane solvent based caulk sealant may be applied twice. Then, data on the performance of the TPO membrane may be collected. In some circumstances, caulk swelling height may be measured within 7 days of caulk application. Swelling height greater than about 0.625" (e.g., total swollen height minus original height) may indicate poor swelling resistance and may be undesirable. In contrast, swelling height of less than about 0.25" (e.g., total swollen height minus original height) may indicate desirable swelling resistance and may indicate minimal swelling.

Stretchability may also be measured in various manners. For example, Breaking Strength Procedure A-Grab Test Method under ASTM D751-98 may be used to measure breaking strength of TPO samples. In some circumstances, TPO samples may be cut in 6" by 4" sections. Further, measuring techniques may involve calibrating a load cell. Then, the specimen may be placed symmetrically between two clamps of an Instron machine. The longer dimension may be placed parallel to the shorter dimension and may be at right angles to the direction of force application. The distance between the two clamps on TPO membrane may be about 3 inches. Then, the Instron machine may be started. The Instron machine may be adjusted so that the pulling clamp has a uniform speed. In some circumstances, the uniform speed may be about 12±0.5 inch/min Data may be collected for the force (in lbf) required to stretch the TPO membrane by 1" distance. If the distance between the two clamps is initially 3 inches, data may be collected when the TPO membrane is stretched to a distance of 4 inches between the two clamps. Force data on stretchability may be reported as the average of five individual test results.

By way of example only, details for two specific embodiments of the present disclosure are provided in Table 1. As shown in Table 1, examples 1 and 2 may comprise varying concentrations of TPO and TPV. In contrast, example 3 may comprise only TPO and no TPV. As demonstrated by examples 1 and 2, in some embodiments of the present disclosure, TPO concentration may be about 71% by weight. In some embodiments, TPO concentration may be about 67% by weight. In some embodiments, TPV concentration may be about 18% by weight. In some embodiments, TPV concentration may be about 22% by weight. Some concentrations are provided by way of example only and other concentrations or ranges of concentrations may be used without departing from the description herein. For example, TPO concentration may range from about 65% to about 75% by weight. As another example, TPV concentration may range from about 15% to about 25% by weight. Further, additional examples are provided below illustrating different ranges for the concentrations of TPO and TPV components.

Both examples 1 and 2 achieve relatively slim thicknesses that may not be achievable in conventional thermoplastic-olefin-based roofing membranes. Next, both examples 1 and 2 achieve good performance in stretchability at about 28 lbf and about 26 lbf for examples 1 and 2, respectively. Stretchability achieved by examples 1 and 2 may be comparable to the stretchability of example 3. Some embodiments of the present disclosure may exhibit stretchability of about 14 lbf to about 30 lbf. Some embodiments of the present disclosure may exhibit stretchability of about 20 lbf to about 28 lbf. Some embodiments of the present disclosure may exhibit stretchability of about 26 lbf to about 28 lbf.

Further, both examples 1 and 2 exhibit good performance in tear strength. Tear strength may be measure using ASTM D751 method B. As shown in Table 1, examples 1 and 2 have tear strength of about 14/16 lbf and 15/18 lbf, respectively. Some embodiments of the present disclosure may exhibit stretchability of about 14 lbf to about 30 lbf. Tear strength exhibited by examples 1 and 2 may be comparable to the tear strength of example 3.

Both examples 1 and 2 also exhibit no signs of roll blocking of the membrane rolls at about 120° F. of elevated temperature. Roll blocking may be measured and/or observed through various methods. For example, rolls of non-reinforced stretchable TPO membranes may be used to measure and/or observed for roll blocking. In some circumstances, the rolls may be 350 ft rolls. Two rolls may be vertically stacked and may have been disposed at about 120° F. for at least 7 days. Then, the rolls may be removed from the 120° F. environment. Then, a force may be applied to the roll of non-reinforced stretchable TPO membrane to observe the ease with which the roll unfolds. For example, a force such as a kick or a thrust may be applied to the roll. If additional or excessive force is required to unfold the TPO membrane, the TPO membrane roll may be described as blocking. If the TPO membrane unfolds naturally with ease, then the TPO membrane may be described as exhibiting low or minimal roll blocking.

Lastly, both examples 1 and 2 exhibit minimal roofing caulk swelling. Both examples 1 and 2 may exhibit total membrane swelling heights or thicknesses of about 0.25" or less. In contrast, example 3, comprising no TPV, may exhibit severe swelling and may exhibit total membrane swelling heights or thicknesses of about 0.625" or more. Reduced and/or minimal roofing caulk swelling can be seen in FIG. 2. Thermoplastic-olefin-based roofing membranes of the present disclosure exhibiting reduced and/or minimal roofing caulk swelling may be advantageous for use on roofing constructions of occupancy structures. In roofing constructions, it may be desirable to shield or otherwise protect in interior of the occupancy structure from factors such as weather, sunlight, and other environmental forces. For example, RVs may be exposed to extensive amounts of environmental forces. Thus, thermoplastic-olefin-based roofing membranes of the present disclosure may be particularly useful for use in roofing constructions of RVs. Use of the presently disclosed roofing membranes on RVs may, for example, prevent water leakage through cracks or fissures in the roofing membranes or adjacent caulk sealants caused by deformation and/or swelling of roofing membranes.

TABLE 2

| | | Roofing Membrane Formulations | | | |
|---|---|---|---|---|---|
| Raw Material | Material Type | Light Gray % by Weight | Beige % by Weight | Gray % by Weight | Other Color % by Weight |
| ExxonMobil Vistamaxx 6102 | TPO resin | 38.5% | 38.5% | 37.7% | 39%-43% |
| CaCO3 | Extender | 35.0% | 35.0% | 35.0% | 35.0% |
| TiO2 Powder | Colorant | 3.5% | 3.5% | 3.5% | |
| UV Concentrate 1 | AO/UV | 5.0% | 5.0% | 5.0% | |
| UV Concentrate 2 | AO/UV | | | | 5.0% |
| RV Gray Color Concentrate | Colorant | 2.0% | | | |
| RV Tan Color Concentrate | Colorant | | 2.0% | | |
| Gray Color Concentrate | Colorant | | | 2.8% | |
| Flint Hills P6E2A005B | TPO resin | 6.0% | 6.0% | 6.0% | 6.0% |
| Santoprene 201-87 | TPV | 10.0% | 10.0% | 10.0% | 10.0% |
| Custom Color Concentrate | Colorant | | | | 1%-5% |
| Total: | | 100.0% | 100.0% | 100.0% | 100.0% |

TABLE 3

| | | Roofing Membrane Formulations | | | |
|---|---|---|---|---|---|
| Raw Material | Material Type | Light Gray % by Weight | Beige % by Weight | Gray % by Weight | Other Color % by Weight |
| ExxonMobil Vistamaxx 6102 | TPO resin | 36.5% | 36.5% | 35.7% | 37%-41% |
| CaCO3 | Extender | 35.0% | 35.0% | 35.0% | 35.0% |
| TiO2 Powder | Colorant | 3.5% | 3.5% | 3.5% | |
| UV Concentrate 1 | AO/UV | 5.0% | 5.0% | 5.0% | |
| UV Concentrate 2 | AO/UV | | | | 5.0% |
| RV Gray Color Concentrate | Colorant | 2.0% | | | |
| RV Tan Color Concentrate | Colorant | | 2.0% | | |
| Gray Color Concentrate | Colorant | | | 2.8% | |
| Flint Hills P6E2A005B | TPO resin | 8.0% | 8.0% | 8.0% | 8.0% |
| Sarlink 4165N | TPV | 10.0% | 10.0% | 10.0% | 10.0% |
| Custom Color Concentrate | Colorant | | | | 1%-5% |
| Total: | | 100.0% | 100.0% | 100.0% | 100.0% |

By way of example only, details for certain specific embodiments of the present disclosure are provided in Table 2 and Table 3. As shown in Tables 2 and 3, various colors of roofing membranes may be achieved in the present disclosure. For example, colors such as white, beige, and gray may be achieved based on the colorant selected. Colorants used may include TiO2 Powder, RV Gray, RV Tan, Gray color concentrates, or any combination thereof. Other colorants may be used or selected in order to achieve various design purposes for a roofing membrane.

Further, concentrations of the colorant used may vary. Concentrations may range from about 1.5% to about 3.0% by weight. In some embodiments the concentration of a colorant may be about 2.0%. In some embodiments, it may be advantageous to use less than about 5% by weight of a colorant. Further, in some embodiments, when the concentration or amount of colorant is increased or decreased, it may be advantageous to vary the concentration or amount of TPO in an inverse manner. Such variations in the concentration of the colorant may be made without departing from the present disclosure.

As Tables 2 and 3 show, PBE resins such as ExxonMobil Vistamaxx 6102 and/or Custom Color concentrates may be used. Other suitable PBE resins may be used without parting from the present disclosure. Concentration or % by weight of the selected TPO resin may also vary. The concentration of the PBE selected may range from about 38% to about 45% by weight. In some embodiments, the concentration of the PBE selected may range from about 39% to about 43%. In some embodiments, the concentration of the PBE selected may range from about 37% to about 41%. In some embodiments, the concentration of the PBE selected may range from about 45% to about 50%. The specific concentration of the PBE selected may be varied without departing from the present disclosure.

As Tables 2 and 3 show, TPV such as Santoprene 201-87 and Sarlink 4165N may be used. However, other suitable TPVs may be used without parting from the present disclosure. The concentration of the TPV selected may range from about 5% to about 15% by weight. In some embodiments, the concentration of TPV is about 10% by weight. In some embodiments, the concentration of TPV is about 8% to about 12% by weight. The specific concentration of the TPV selected may be varied without departing from the present disclosure.

Further, as Tables 2 and 3 show, additional components may be included in the compositions of thermoplastic-olefin-based roofing membranes described herein. Such components may be included in the compositions to achieve various design or functional goals and may be included without departing from the present disclosure.

Further Disclosures Regarding these and Extended Embodiments

As will be understood by one of ordinary skill in the art having the benefit of the instant disclosure, other equivalent or alternative compositions, systems, methods for thermoplastic-olefin-based roofing membranes can be envisioned without departing from the description contained herein. Accordingly, the manner of carrying out the disclosure as shown and described is to be construed as illustrative only.

Embodiments of the present disclosure may not be limited to roofing structures of RVs. Rather, embodiments of the present disclosure may be applied to any number of roofing structures such as roofing structures for vehicles, homes, or other occupancy structures. In some embodiments, occupancy structures may have a surface area of less than 500 square feet. In some embodiments, benefits of embodiments of the present disclosure may be particular advantageous for roofing structures wherein the roofing structure is not one flat roof. For example, embodiments of the present disclosure may advantageous provide for a roofing membrane that conforms to and/or fits against the curvature of the roofing structure or between transitions of different segments or sections of a roofing structure.

Further, one of ordinary skill in the art may make various changes in the shape, size, number, and/or arrangement of parts without departing from the scope of the instant disclosure. For example, the type and concentration of TPO and/or TPV may be varied. In some embodiments, other components such as color additives, other polymers, or powders may be optional and/or interchangeable with other appropriate color additives, polymers, or powders. In addition, the size of thermoplastic-olefin-based roofing membranes or the corresponding roofing structures may be scaled up or down to suit the needs and/or desires of a practitioner. Similarly, the size of thermoplastic-olefin-based roofing membranes or the corresponding roofing structures may be scaled up or down to fit the design or structural requirements of a particular occupancy structure, such as an RV.

Each disclosed method and method step may be performed in association with any other disclosed method or method step and in any order according to some embodiments. Where the verb "may" appears, it is intended to convey an optional and/or permissive condition, but its use is not intended to suggest any lack of operability unless otherwise indicated. Persons skilled in the art may make various changes in methods of preparing and using a composition and/or system of the present disclosure. Accordingly, the foregoing disclosure is intended to be illustrative, but not limiting, of the scope of the disclosure as illustrated by the appended claims.

Also, where ranges have been provided, the disclosed endpoints may be treated as exact and/or approximations as desired or demanded by the particular embodiment. Where the endpoints are approximate, the degree of flexibility may vary in proportion to the order of magnitude of the range. For example, on one hand, a range endpoint of about 50 in the context of a range of about 5 to about 50 may include 50.5, but not 52.5 or 55 and, on the other hand, a range endpoint of about 50 in the context of a range of about 0.5 to about 50 may include 55, but not 60 or 75. In addition, it may be desirable, in some embodiments, to mix and match range endpoints. Also, in some embodiments, each figure disclosed (e.g., in one or more of the examples, tables, and/or drawings) may form the basis of a range (e.g., depicted value +/−about 10%, depicted value +/−about 50%, depicted value +/−about 100%) and/or a range endpoint. With respect to the former, a value of 50 depicted in an example, table, and/or drawing may form the basis of a range of, for example, about 45 to about 55, about 25 to about 100, and/or about 0 to about 100.

The title, abstract, background, and headings are provided in compliance with regulations and/or for the convenience of the reader. They include no admissions as to the scope and content of prior art and no limitations applicable to all disclosed embodiments.

The invention claimed is:

1. A thermoplastic-olefin-based roofing membrane comprising:
    a polymer blend comprising:
        a thermoplastic olefin elastomer at about 30% to about 75% by weight of the polymer blend;
        a thermoplastic vulcanizate at about 10% to about 40% by weight of the polymer blend;
        a thermoplastic polyolefin copolymer at about 5% to about 10% by weight of the polymer blend;
    wherein the thermoplastic olefin-based roofing membrane is a single ply membrane remaining substantially free of swelling when exposed to an elastomer polymer compound;
    wherein the thermoplastic olefin-based roofing membrane is about 20 mils to about 40 mils thick; and
    wherein the thermoplastic-olefin-based roofing membrane comprises a stretchability of about 14 lbf to about 30 lbf.

2. The thermoplastic-olefin-based roofing membrane of claim 1, wherein the polymer blend comprises about 10% to about 25% by weight of the thermoplastic vulcanizate.

3. The thermoplastic-olefin-based roofing membrane of claim 1, wherein the polymer blend comprises about 35% to about 50% by weight of the thermoplastic olefin elastomer.

4. The thermoplastic-olefin-based roofing membrane of claim 1, wherein the thermoplastic-olefin-based roofing membrane comprises a stretchability of about 20 lbf to about 28 lbf.

5. The thermoplastic-olefin-based roofing membrane of claim 1, wherein the thermoplastic olefin elastomer is a polypropylene based ethylene propylene elastomer.

6. The thermoplastic-olefin-based roofing membrane of claim 1, wherein the thermoplastic olefin elastomer is a propylene/alpha-olefin copolymer comprising a semi-crystalline isotactic propylene segment.

7. The thermoplastic-olefin-based roofing membrane of claim 6, wherein the alpha-olefin is selected from the group consisting of ethylene, butane, pentene, 4-methyl-1-pentene, hexane, heptene, octane and nonene.

8. The thermoplastic-olefin-based roofing membrane of claim 1, wherein the thermoplastic vulcanizate is a crosslinked ethylene propylene diene monomer and polypropylene blend.

9. The thermoplastic-olefin-based roofing membrane of claim 1, wherein the thermoplastic olefin copolymer is an impact polypropylene copolymer.

10. The thermoplastic-olefin-based roofing membrane of claim 9, wherein the impact polypropylene copolymer comprises at least a monomer, the monomer comprising ethylene.

11. The thermoplastic-olefin-based roofing membrane of claim 1, wherein the thermoplastic-olefin-based roofing membrane further comprises a colorant.

12. The thermoplastic-olefin-based roofing membrane of claim 1, wherein the thermoplastic-olefin-based roofing membrane is applied to a roofing construction of a recreational vehicle.

13. The thermoplastic-olefin-based roofing membrane of claim 1, wherein substantially free of swelling provides for a swelling height of less than about 0.25".

14. The thermoplastic-olefin-based roofing membrane of claim 1, wherein the thermoplastic olefin-based roofing membrane is about 28 mils thick.

\* \* \* \* \*